N. BARNEY,

Assignor to THE BARNEY DUMPING BOAT COMPANY.

Automatically Dumping Boat.

No. 9,544. Reissued Jan. 25, 1881.

Witnesses:-
Geo. Haynes
Ed. Glatzmayer

Inventor:-
Nathan Barney
by his Attorneys
Brown & Brown

N. PETERS, PHOTO-LITHOGRAPHER, WASHINGTON, D. C.

UNITED STATES PATENT OFFICE.

NATHAN BARNEY, OF BERGEN POINT, NEW JERSEY, ASSIGNOR TO THE BARNEY DUMPING BOAT COMPANY.

AUTOMATICALLY-DUMPING BOAT.

SPECIFICATION forming part of Reissued Letters Patent No. 9,544, dated January 25, 1881.

Original No. 226,960, dated April 27, 1880. Application for reissue filed December 8, 1880.

*To all whom it may concern:*

Be it known that I, NATHAN BARNEY, of Bergen Point, in the county of Hudson and State of New Jersey, have invented certain new and useful Improvements in Automatically-Dumping Boats; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The invention relates to an improved automatically-dumping boat, which is so constructed that after being dumped its parts will automatically and accurately return to their normal position.

The invention consists in the combination, in a dumping-boat, of two parts or floats, hinged at their upper and outer longitudinal edges, and having their surfaces, on which the load is placed, inclined inwardly and downwardly toward each other when the said floats are brought close together.

It also consists in a dumping-boat having its bottom in two parts or floats pivoted on opposite sides of a suitable platform and the ends geared together, whereby the boat is opened longitudinally to dump the load, and the two parts or floats are maintained in accurate relation to each other, and are caused to move simultaneously in opening and closing.

It also consists in the construction and arrangement of parts, as will hereinafter be more fully set forth.

Figure 1:
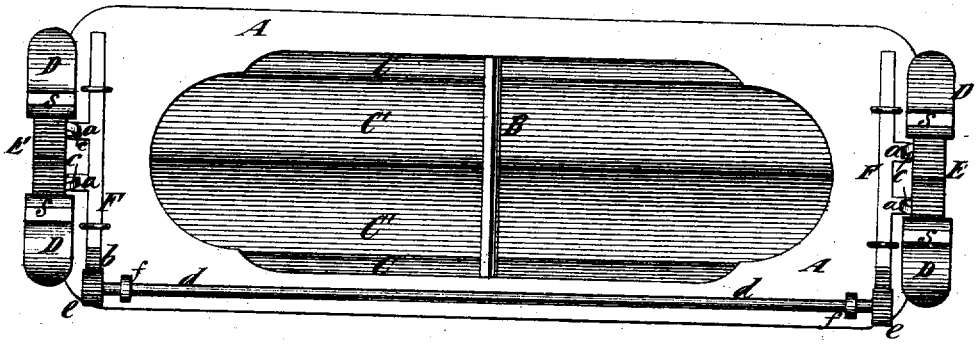
Figure 2:
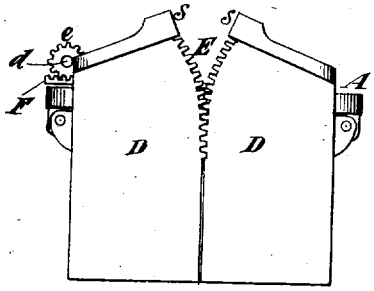
Figure 3:
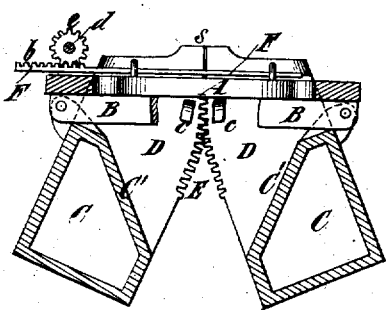

In the annexed drawings, Figure 1 is a plan view. Fig. 2 is an end elevation with the bottom closed. Fig. 3 is a central vertical section with the bottom open, and Fig. 4 a similar view with the bottom closed.

In the drawings, A represents the platform or deck; B, the cross-pieces on the under side of the deck, to which the bottom is pivoted; C C, the divided bottom, which is composed of two floats or parts hinged at the upper and outer longitudinal edges to the deck; D, the ends; E, cogs on the ends; F, sliding bolts; *a*, projections on bolts; *b*, racks on bolts; *c*, ears on the ends to engage with projections *a* on bolts; *d*, rod; *e*, pinions secured on rod *d* and engaging with the racks *b*; *f*, bearings for the rod *d*.

The platform A is represented with cross-pieces B strengthening the same, and their ends passing in slotted standards secured upon the side of the bottom C C and pivoted thereto, as shown, thereby allowing the bottom to open and close, as desired.

The upper portions of the ends D are geared together, as here represented, by means of cogs E, which, when the bottom is opened and closed, engage with each other and guide the parts, keeping them in proper relation to each other.

The rod *d* may have attached to it a permanent lever, or it may be square at certain portions to receive a wrench.

When the bottom is closed the ears *c* rest upon the projections *a* and hold the parts together, and the bottom may also be held open in the same manner.

The ends D above the cogs E are constructed with parts *s*, which project beyond the bottoms of the cogs, and when the two parts or floats are released, and by the weight of the load drop into the position shown in Fig. 3, these parts *s* abut together and form stops to prevent further movement of the floats or parts.

Figure 4:
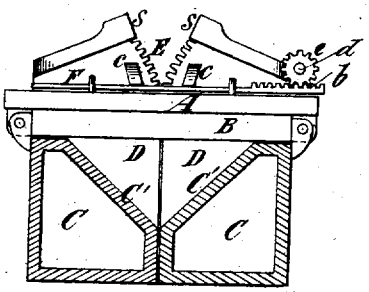

The two floats or parts which compose the divided bottom have their surfaces C′ C′, which receive the load, inclined inwardly and downwardly toward each other when they are brought together, as shown in Fig. 4.

The operation of the device is as follows: When it is desired to dump the load the rod *d* is turned. The pinions thereon, engaging with the racks on the sliding bolts, draw the projections *a* from under the ears *c* and permit the load to pass through. If the load is not perfectly dumped the bottom may be held open, as shown in Fig. 3, and the boat towed in that position until it is perfectly free from its load. As soon as the boat is relieved from the load, or, if held open by the bolt, as soon as the bolt is drawn, the bottom closes automatically and is secured by the bolt, when it is ready to receive another load.

The advantages of this device are many. It greatly reduces the cost of labor, as one man can operate the device easily. Its simplicity and cheapness of construction are obvious, and it is not liable to get out of repair.

The boat may be provided with a bow, if desired.

When the two parts or floats are separated, as shown in Fig. 3, to dump the load, a clear passage is afforded between them, and any light garbage or refuse which will not immediately sink may be got rid of by towing the boat ahead. As the two parts or floats are geared together at each end they are caused to move together, and are maintained in accurate relation to each other, so that they move simultaneously in opening and closing.

By inclining the surfaces C′ C′ of the floats or parts which receive the load at about forty-five degrees, as shown, they may be opened wide to dump the load by a movement on their pivots only half as great as would be necessary if their load-supporting surfaces C′ C′ were horizontal. Where the parts or floats have inclined top surfaces the center of gravity of the load is lowered and the boat rendered more seaworthy.

Having thus fully described my invention, what I claim as new, and desire to secure by Letters Patent, is—

1. The combination, in a dumping-boat, of two floats or parts, hinged at their upper and outer longitudinal edges, and having the surfaces on which the load is placed inclined inwardly and downwardly toward each other when said floats or parts are brought close together, substantially as and for the purpose set forth.

2. A dumping-boat having its bottom in two parts, pivoted on opposite sides of a suitable platform and the ends geared together, whereby the boat is opened longitudinally to dump the load, and is returned automatically and accurately to its former position, substantially as and for the purpose set forth.

3. The platform A, cross-pieces B, having the bottom C C pivoted thereto, and the ends D, having the cogs E, substantially as and for the purpose set forth.

4. The combination, with a platform or deck, of the two floats or parts C C hinged thereto, and having their ends D provided with cogs E and stops *s*, substantially as and for the purpose specified.

In testimony that I claim the foregoing as my own I have hereto affixed my signature in presence of two witnesses.

N. BARNEY.

Witnesses:
FREDK. HAYNES,
ED. GLATZMAYER.